United States Patent
Takayama et al.

(10) Patent No.: US 9,592,755 B2
(45) Date of Patent: Mar. 14, 2017

(54) VEHICLE SEAT

(75) Inventors: Masami Takayama, Yokohama (JP); Atsushi Kageyama, Yokohama (JP); Ken Okura, Yokohama (JP); Junichi Nakano, Yokohama (JP); Nozomu Munemura, Yokohama (JP); Kensuke Nagai, Yokohama (JP); Tadanori Hisamoto, Yokohama (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 167 days.

(21) Appl. No.: 14/128,488

(22) PCT Filed: Jun. 13, 2012

(86) PCT No.: PCT/JP2012/065162
§ 371 (c)(1),
(2), (4) Date: Dec. 20, 2013

(87) PCT Pub. No.: WO2013/005546
PCT Pub. Date: Jan. 10, 2013

(65) Prior Publication Data
US 2014/0132048 A1 May 15, 2014

(30) Foreign Application Priority Data
Jul. 3, 2011 (JP) ................. 2011-147815

(51) Int. Cl.
*B60N 2/42* (2006.01)
*B60N 2/48* (2006.01)
*B60R 21/055* (2006.01)

(52) U.S. Cl.
CPC ......... *B60N 2/4228* (2013.01); *B60N 2/4885* (2013.01); *B60R 21/055* (2013.01); *B60N 2002/4897* (2013.01)

(58) Field of Classification Search
CPC .... B60N 2/4248; B60N 2/4845; B60R 21/055
See application file for complete search history.

(56) References Cited

U.S. PATENT DOCUMENTS 5,938,279 A 8/1999 Schubring et al.
7,758,115 B2 * 7/2010 Yamaguchi et al. ..... 297/216.12
(Continued)

FOREIGN PATENT DOCUMENTS

JP S61-149552 U 9/1986
JP H07-001842 1/1995
(Continued)

OTHER PUBLICATIONS

Notice of Reasons for Rejection mailed Feb. 17, 2015 in corresponding Japanese Application No. 2011-147815.
(Continued)

*Primary Examiner* — David E Allred
*Assistant Examiner* — Jody Giacoman
(74) *Attorney, Agent, or Firm* — Knobbe Martens Olson & Bear LLP

(57) ABSTRACT

The time until a headrest contacts the head of an occupant in the event of a rear collision is shortened with a simple configuration. In a seat device, a stay (46) (including grommets (22)) is set with bending rigidity towards the vehicle front lower than the bending rigidity towards the vehicle rear. Accordingly, when the headrest oscillates in the event of a vehicle rear collision, the headrest is initially displaced towards the vehicle rear, however the headrest changes direction in a short time and begins to be displaced towards the vehicle front. Moreover, there is a large displacement of the headrest towards the vehicle front since the stay (46) (including the grommets (22)) has a lower bending rigidity towards the vehicle front than the bending rigidity towards the vehicle rear. The time until the headrest contacts the head (Continued)

(H) of the occupant can accordingly be shortened. The headrest can be promptly displaced towards the side of the head (H) of the occupant due to setting the bending rigidity of the stay (46) including the grommets (22), thereby enabling the time until the headrest contacts the head of the occupant to be shortened with a simple configuration.

3 Claims, 11 Drawing Sheets

(56) References Cited

U.S. PATENT DOCUMENTS

| | | |
|---|---|---|
| 8,967,721 B2* | 3/2015 | Muto et al. ............ 297/410 |
| 8,991,927 B2* | 3/2015 | Wisniewski et al. ......... 297/410 |
| 2006/0163931 A1* | 7/2006 | Yamada ............ 297/410 |
| 2010/0156152 A1* | 6/2010 | Chen et al. ............ 297/112 |
| 2015/0097409 A1* | 4/2015 | Nakata ............ B60N 2/4808 297/391 |
| 2015/0165945 A1* | 6/2015 | Takahashi ............ B60N 2/4808 297/404 |

FOREIGN PATENT DOCUMENTS

| | | | |
|---|---|---|---|
| JP | 2000-85432 | 3/2000 | |
| WO | WO 2010067530 A1 * | 6/2010 | ............ B60N 2/48 |

OTHER PUBLICATIONS

Chinese Office Action dated Aug. 28, 2015 in corresponding application No. 201280031213.X.

\* cited by examiner

VEHICLE SEAT

CROSS-REFERENCE TO RELATED APPLICATIONS

This application is the U.S. National Phase under 35 U.S.C. §371 of International Application Number PCT/JP2012/065162, filed Jun. 13, 2012, designating the United States of America, which claims priority under 35 U.S.C. §119 to Japanese Patent Application Number 2011-147815, filed Jul. 3, 2011. The disclosures of the above-described applications are hereby incorporated by reference in their entirety. The International Application was published under PCT Article 21(2) in a language other than English.

TECHNICAL FIELD

The present invention relates to a vehicle seat equipped with a headrest that supports the head of an occupant.

BACKGROUND ART

Patent Document 1 below describes a vehicle seat wherein an impact pressure bearing frame is disposed to the front of a seatback frame, and a lower end portion of the impact pressure bearing frame is fixed to the seatback frame. A headrest support frame that supports a headrest is joined to an upper end portion of the impact pressure bearing frame, and the headrest support frame is supported on the seatback frame through a turning member such that the headrest support frame is capable of turning.

In the event of a vehicle rear collision, the headrest is moved (displaced) towards the front (what is known as an "active headrest"). The occupant is suppressed from sustaining whiplash injury due to the headrest restraining the head of the occupant.

Note that in the event of a vehicle rear collision, it is desirable for the head of the occupant that is moving towards the vehicle rear under inertia to be promptly restrained by the headrest.

Patent Document 1: Japanese Utility Model Application Laid-Open (JP-U) No. H07-001842

SUMMARY OF INVENTION

Technical Problem

However, in this vehicle seat consideration is not given to the time until the headrest begins to restrain the head of the occupant (the time until the headrest contacts the head of the occupant). Moreover, this vehicle seat requires a mechanism to move (turn) the headrest towards the front, leading to a more complicated structure.

In vehicle seats that are not equipped with active headrests such as that of the vehicle seat described above, a stay of the headrest is supported by the seatback frame. In the event of a vehicle rear collision, impact force is input into the seatback frame, and the stay oscillates together with the headrest about a location where the stay is supported by the seatback frame. However, in such vehicle seats consideration is not given to the time until the headrest begins to restrain the head of the occupant.

In consideration of the above circumstances, an object of the present invention is to provide a vehicle seat capable of shortening the time until a headrest contacts the head of an occupant in the event of a rear collision with a simple configuration.

Solution to Problem

A vehicle seat according to a first aspect includes: a seatback that holds the upper torso of an occupant; a headrest that is provided above the seatback, and that supports the head of the occupant; retaining member that is attached to the seatback; and a support member that projects out from the headrest and supports the headrest, that is inserted into an insertion hole in the retaining member, and that is set with a bending rigidity including the retaining member towards the vehicle front lower than the bending rigidity towards the vehicle rear.

In the vehicle seat of the first aspect, the headrest is provided above the seatback. The support member that supports the headrest projects out from the headrest, and the retaining member is attached to the seatback. The support member is inserted into the insertion hole of the retaining member.

The support member is set with lower bending rigidity including the retaining member towards the vehicle front than the bending rigidity towards the vehicle rear. When impact force is input to the seatback and the headrest oscillates in the event of a vehicle rear collision, the headrest is initially displaced towards the vehicle rear under inertia, however the headrest changes direction in a short time and begins to be displaced towards the vehicle front side, due to the bending rigidity of the support member including the retaining member towards the vehicle rear being greater than the bending rigidity towards the vehicle front. There is a large displacement of the headrest towards the vehicle front since the bending rigidity of the support member including the retaining member towards the vehicle front is lower than the bending rigidity towards the vehicle rear. The time until the headrest contacts the head of the occupant can accordingly be shortened. The headrest can therefore promptly restrain the head of the occupant that moves towards the vehicle rear in the event of a vehicle rear collision. The headrest can be promptly displaced towards the side of the head of the occupant due to setting the bending rigidity of the support member including the retaining member, thereby enabling the time until the headrest contacts the head of the occupant to be shortened with a simple configuration.

A vehicle seat according to a second aspect is the vehicle seat of the first aspect, wherein: the bending rigidity of the support member including the retaining member is adjusted such that a contact time until the head of an occupant contacts the headrest in the event of a vehicle rear collision is equal to or longer than a reference time until the velocity of the headrest towards the vehicle front reaches a reference value or below.

In the vehicle seat of the second aspect, due to adjusting the bending rigidity of the support member including the retaining member the contact time until the head of the occupant contacts the headrest in the event of a vehicle rear collision is equal to or longer than the reference time until the velocity of the headrest towards the vehicle front reaches the reference value or below. A reduction in the velocity of the head of the occupant at the point in time at which the head contacts the headrest (the point in time at which the headrest begins to restrain the head of the occupant) is accordingly suppressed. A reduction in the velocity with which the head enters the headrest when the head of the occupant makes contact with the headrest can thereby be suppressed.

Note that the headrest is generally formed from a foamed material such as urethane. The reaction force of the headrest with respect to the head decreases with a decrease in the velocity with which the head enters the headrest. However, as described above, when the head of the occupant makes contact with the headrest, a reduction in the velocity with which the head enters the headrest is suppressed, thereby suppressing a reduction in the reaction force of the headrest with respect to the head. In the balance of the reaction force of the headrest on the head and the force of the head acting on the headrest, a reduction in the acceleration of the head of the occupant during restraint of the head by the headrest is suppressed since the weight of the head is fixed.

The difference between the acceleration of the shoulders of the occupant and the acceleration of the head of the occupant can be suppressed from increasing due to suppressing a reduction in the head acceleration during restraint of the head of the occupant by the headrest, thereby improving the whiplash injury criterion (NIC) characteristics.

A vehicle seat according to a third aspect is the vehicle seat of either the first aspect or the second aspect, further including: a front side restriction portion that restricts bending of the retaining member towards the vehicle front at an attachment location to the seatback of a vehicle front side portion of the retaining member; and a rear side restriction portion that restricts bending of the retaining member towards the vehicle rear and that is disposed at a location that is an attachment location to the seatback of a vehicle rear side portion of the retaining member and that is also a location on the headrest side with respect to the front side restriction portion.

In the vehicle seat according to the third aspect, the front side restriction portion restricts bending of the retaining member towards the vehicle front at the attachment location of the vehicle front side portion of the retaining member to the seatback. The rear side restriction portion restricts bending of the retaining member towards the vehicle rear and is disposed at a location that is an attachment location to the seatback of the vehicle rear side portion of the retaining member and that is also a location on the headrest side with respect to the front side restriction portion. The retaining member is accordingly supported by the rear side restriction portion during displacement of the headrest towards the vehicle rear, and the retaining member is supported by the front side restriction portion during displacement of the headrest towards the vehicle front. The distance from the headrest to the front side restriction portion is moreover greater than the distance from the headrest to the rear side restriction portion, thereby enabling a configuration wherein the headrest is more readily displaced towards the vehicle front than the headrest is displaced towards the vehicle rear. The contact time until the headrest contacts the head of the occupant can accordingly be set easily by varying the position of the front side restriction portion on the retaining member.

A vehicle seat according to a fourth aspect is the vehicle seat of the third aspect, wherein the front side restriction portion and the rear side restriction portion are integrally formed to the retaining member, and are restrained by the seatback.

In the vehicle seat of the fourth aspect, the restriction portions can be provided whilst suppressing an increase in costs due to forming the front side restriction portion and the rear side restriction portion integrally to the retaining member.

A vehicle seat according to a fifth aspect is the vehicle seat of the fourth aspect, wherein: the retaining member is formed in a tube shape, and a pair of the rear side restriction portions are provided in the retaining member axial direction; and the front side restriction portion is disposed in the retaining member axial direction between the pair of the rear side restriction portions.

In the vehicle seat of the fifth aspect, the retaining member is formed in a tube shape, and a pair of the rear side restriction portions are provided in the retaining member axial direction. The front side restriction portion is moreover disposed in the retaining member axial direction between the pair of the rear side restriction portions. The retaining member can accordingly be stably attached to the seatback since the retaining member is attached to the seatback at the locations of the pair of rear side restriction portions and at the location of the front side restriction portion.

Advantageous Effects of Invention

As described above, the vehicle seat of the present invention is capable of shortening the time until the headrest contacts the head of an occupant in the event of a rear collision with a simple configuration.

DESCRIPTION OF EMBODIMENTS

Figure 1:
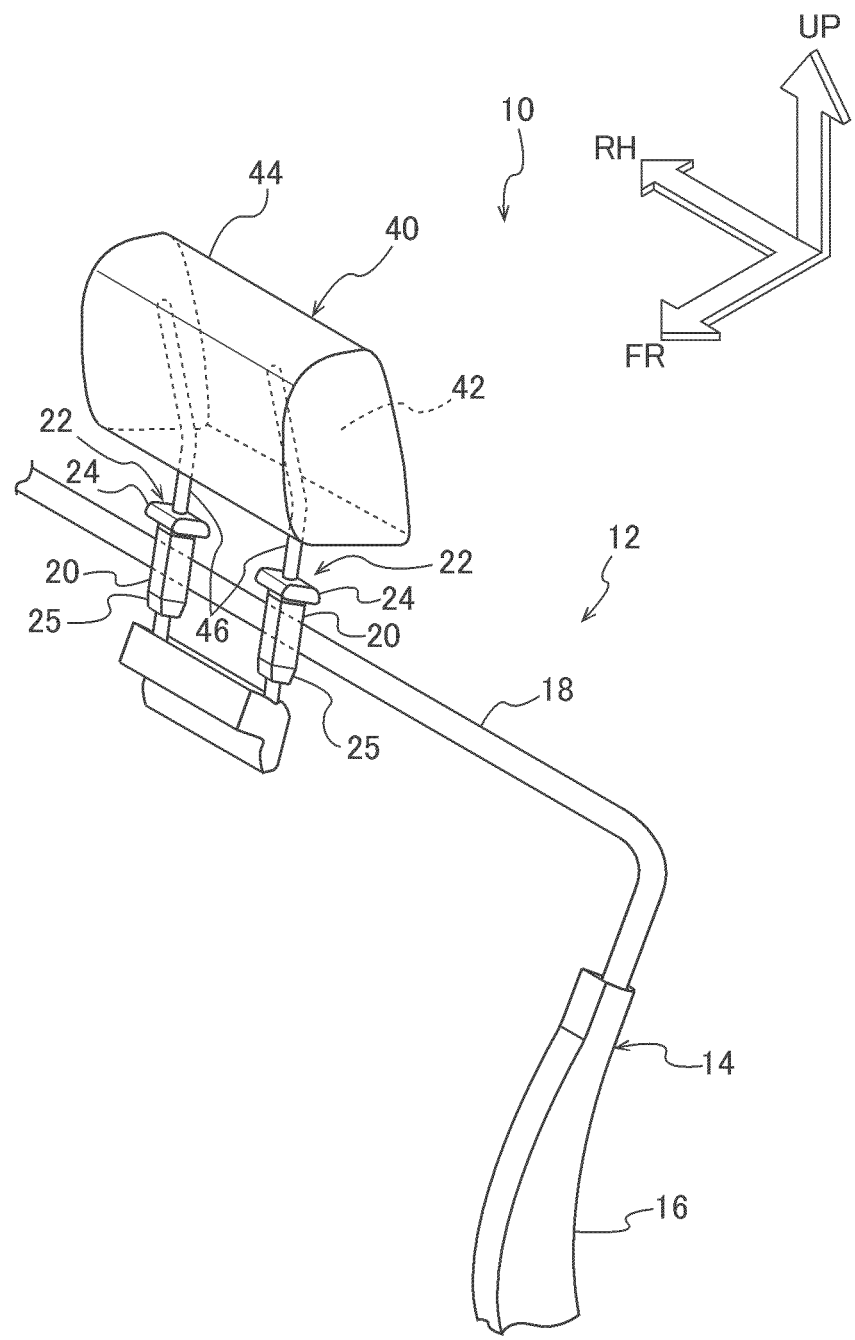
FIG. 1 is a perspective view illustrating relevant portions of a vehicle seat according to an exemplary embodiment of the present invention, as viewed from the front left of the vehicle.
Figure 2:
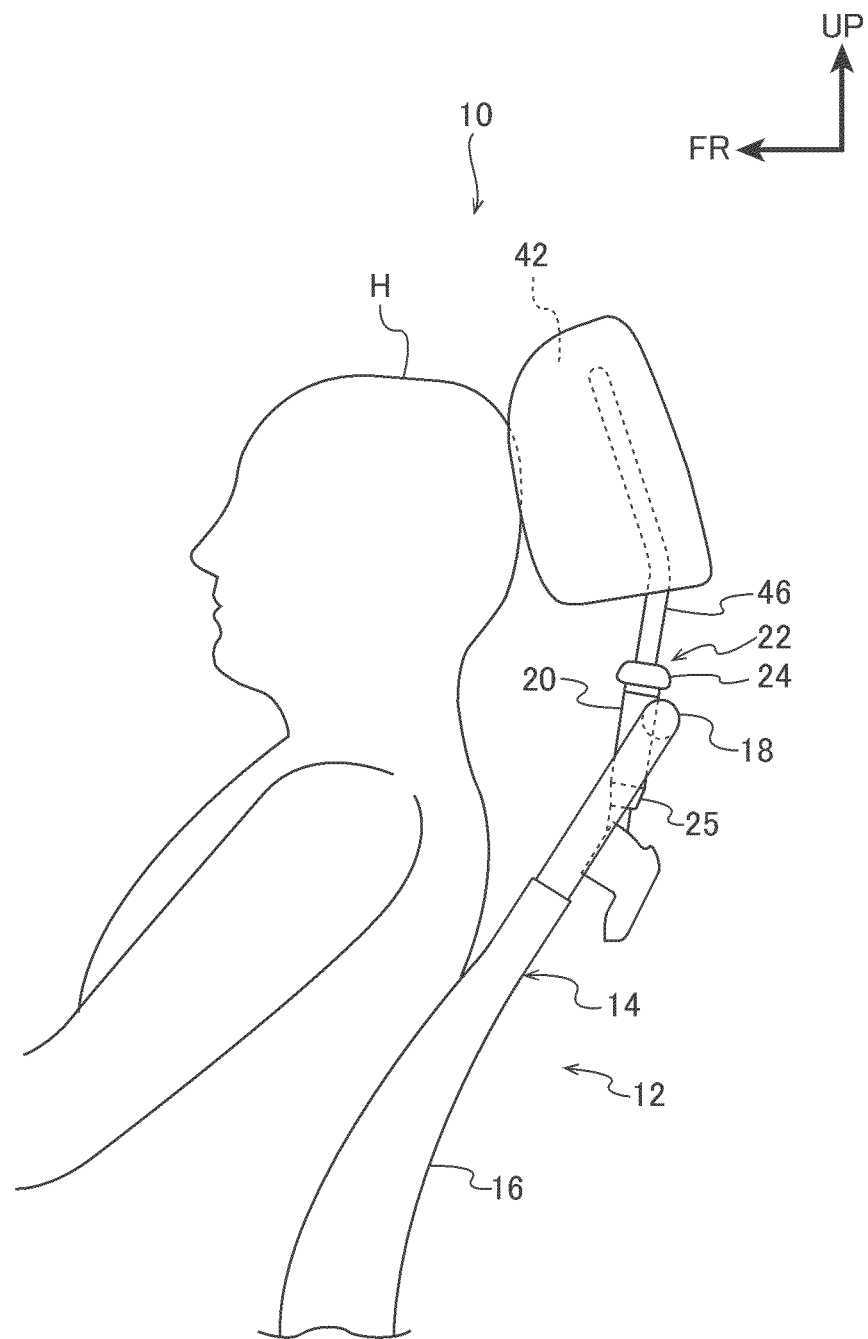
FIG. 2 is a side view illustrating relevant portions of the vehicle seat illustrated in FIG. 1, as viewed from the left of the vehicle.

FIG. 1 is a perspective view illustrating relevant portions of a vehicle seat 10 according to an exemplary embodiment of the present invention as viewed from the front left of the vehicle. FIG. 2 is a side view illustrating relevant portions of the vehicle seat 10 as viewed from the left of the vehicle.

Note that in the drawings, the arrow FR indicates the vehicle front, the arrow RH indicates the right of the vehicle (one vehicle width direction side), and the arrow UP indicates upwards.

As illustrated in FIG. 1 and FIG. 2, the vehicle seat 10 includes a seatback 12. The seatback 12 is disposed in an upright state at a vehicle rear end portion of a seat cushion, not illustrated in the drawings, that configures the vehicle seat 10. The seatback 12 is capable of holding the upper torso of an occupant.

A seatback frame 14 is provided inside the seatback 12. The seatback frame 14 is coupled to a seat cushion frame, not illustrated in the drawings, that is provided inside the seat cushion. The seatback frame 14 is provided with a pair of side frames 16 (only the vehicle left side frame 16 is illustrated in FIG. 1) that are bent into substantially U-shaped cross-section profiles. An elongated pipe shaped upper frame 18 is provided above the side frames 16. The upper frame 18 is bent into an inverted substantially U-shape as viewed from the vehicle front, and both end portions of the upper frame 18 are respectively fixed to the pair of side frames 16.

A pair of holders 20 (elements that may be understood to fall under the definition of "attachment portions") that are manufactured from metal are provided at vehicle front side positions of a length direction intermediate portion of the upper frame 18. The holders 20 are fixed to the upper frame 18 by welding. The holders 20 are formed in substantially rectangular tube shapes, and are disposed running along the up-down direction.

Figure 3:
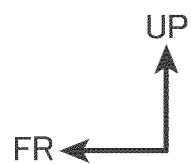
FIG. 3 is a cross-section illustrating a state in which a grommet employed in the vehicle seat illustrated in FIG. 1 is retained in a holder, as viewed from the left of the vehicle.
Figure 3:
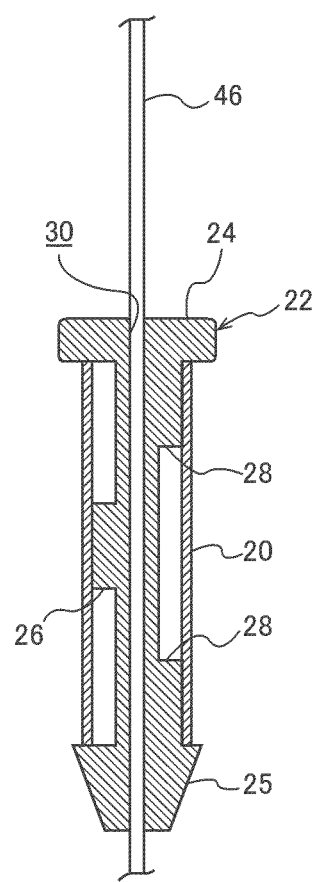

As illustrated in FIG. 3, substantially rectangular tube shaped grommets 22 that serve as support means and retaining members and that are formed from resin are provided inside the pair of holders 20. Substantially rectangular plate shaped head portions 24 are provided at upper ends of the grommets 22, and substantially four-sided pyramid shaped stopper portions 25 are provided at lower end portions of the grommets 22. The grommets 22 are retained inside the holders 20 in a state in which the head portions 24 are in contact with upper ends of the holders 20 and the stopper portions 25 are in contact with lower ends of the holders 20.

Figure 4:
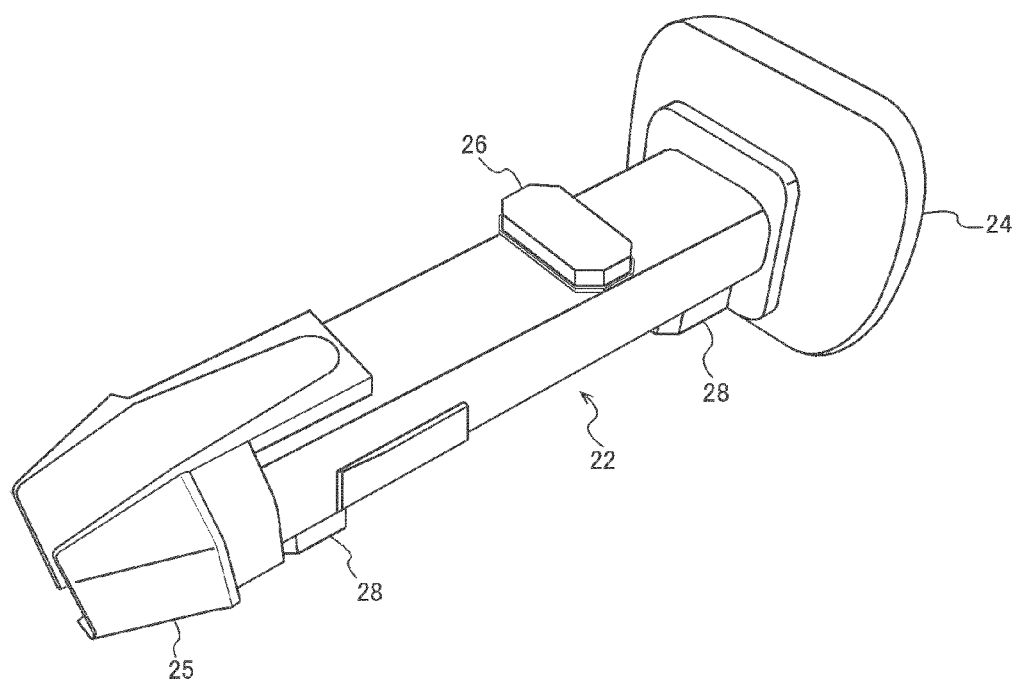
FIG. 4 is a perspective view illustrating the grommet illustrated in FIG. 3.

As illustrated in FIG. 4, a protrusion portion 26 serving as a front side restriction portion is integrally provided at a length direction intermediate portion position of a vehicle front portion of each of the grommets 22. Each protrusion portion 26 is formed in a substantially rectangular shape as viewed from the vehicle front, and projects out from the grommet 22 towards the vehicle front so as to contact an inner peripheral portion of the holder 20. The protrusion portion 26 is accordingly restrained by the holder 20 (the seatback frame 14), and the vehicle front portion of the grommet 22 is supported by the holder 20 at the single location of the protrusion portion 26.

A pair of protrusion portions 28 serving as rear side restriction portions are provided at both length direction end portion positions of a vehicle rear portion of each of the grommets 22. The upper protrusion portion 28 is thereby disposed above the protrusion portion 26. The pair of protrusion portions 28 are formed in substantially rectangular shapes as viewed from the vehicle rear, and project out from the grommet 22 towards the vehicle rear so as to contact an inner peripheral portion of the holder 20. The protrusion portions 28 are accordingly restrained by the holder 20 (the seatback frame 14), and the vehicle rear portion of the grommet 22 is supported by the holder 20 at the 2 locations of the protrusion portions 28.

An insertion hole 30 is formed penetrating the grommet 22 along the grommet 22 length direction (see FIG. 3). The insertion hole 30 is formed with a circular cross-section profile, and a stay 46 of a headrest 40, described later, is inserted into the insertion hole 30.

The headrest 40 is provided above the seatback 12. The headrest 40 includes a pad portion 42 formed from a urethane foamed material, and the pad portion 42 is covered by a covering skin 44. A circular rod shaped stay 46 serving as a support means and also as a support member, is provided inside the pad portion 42. The stay 46 is formed in an inverted substantially U-shape as viewed from the vehicle front, and is bent such that both length direction end portions of the stay 46 are disposed towards the vehicle front as viewed from the left of the vehicle. A length direction intermediate portion of the stay 46 is fixed to the pad portion 42, and both length direction end portions of the stay 46 project out downwards from the headrest 40 and are inserted into the insertion holes 30 of the grommets 22. The stay 46 is moreover prevented from relative movement in the up-down direction by a lock mechanism (not illustrated in the drawings) that is provided to the head portions 24 of the grommets 22. The headrest 40 is accordingly supported by the holders 20 (the seatback frame 14) through the grommets 22, thereby making configuration so as to support the head H of an occupant.

As described above, the vehicle front portions of the grommets 22 are supported by the holders 20 at the single locations of the respective protrusion portions 26, thereby restricting bending of the grommets 22 towards the vehicle front. The vehicle rear portions of the grommets 22 are respectively supported by the holders 20 at the 2 locations of the protrusion portions 28, such that the upper protrusion portions 28 restrict bending of the grommets 22 towards the vehicle rear. Moreover, since the upper protrusion portions 28 are disposed further towards the headrest 40 side than the protrusion portions 26, a distance from the headrest 40 to the protrusion portions 26 is set greater than a distance from the headrest 40 to the upper protrusion portions 28. The headrest 40 is accordingly supported by the holders 20 (seatback frame 14) such that the bending rigidity towards the vehicle front of the stay 46 including the grommets 22 is lower than the bending rigidity towards the vehicle rear of the stay 46 including the grommets 22.

The grommets 22 are retained by the holders 20 such that when impact force is imparted to the seatback 12 in the event of a vehicle rear collision, this impact force is input to the grommets 22 through the seatback frame 14 and the holders 20. Together with the stay 46, the headrest 40 oscillates in the vehicle front-rear direction about the protrusion portions 26 and the protrusion portions 28 of the grommets 22 such that the headrest 40 is displaced in the vehicle front-rear direction with respect to the seatback frame 14. The bending rigidity of the stay 46 (including the grommets 22) towards the vehicle front is configured lower than the bending rigidity of the stay 46 (including the grommets 22) towards the vehicle rear. Accordingly, during oscillation of the headrest 40 the amplitude of the headrest 40 towards the vehicle front is set larger than the amplitude towards the vehicle rear, and the period of the headrest 40 towards the vehicle front is set longer than the period of the headrest 40 towards the vehicle rear.

The bending rigidity of the stay 46 including the grommets 22 is moreover adjusted such that a time from a vehicle rear collision until the head H of the occupant contacts the headrest 40 (this time is referred to as the "contact time") corresponds to a time from the vehicle rear collision until the maximum displacement of the headrest 40 towards the vehicle front (this time is referred to as the "peak time"). Namely, the bending rigidity of the stay 46 including the grommets 22 is adjusted such that the contact time is equal to or longer than a time until the velocity of the headrest 40 towards the vehicle front reaches a predetermined reference value or below (this time is referred to as the "reference time"), such that the velocity of the headrest 40 towards the vehicle front decreases to zero in the peak time.

The vehicle seat 10 of the present exemplary embodiment is configured so as to obtain the following operation. Explanation follows regarding this operation whilst drawing comparison with conventional technology, described below.

In the event of a vehicle rear collision, impact force towards the vehicle front is imparted to the seatback frame 14. This impact force is accordingly input into the grommets 22 through the seatback frame 14 and the holders 20, and the headrest 40 oscillates about the upper frame 18 (the seatback frame 14).

Figure 5:
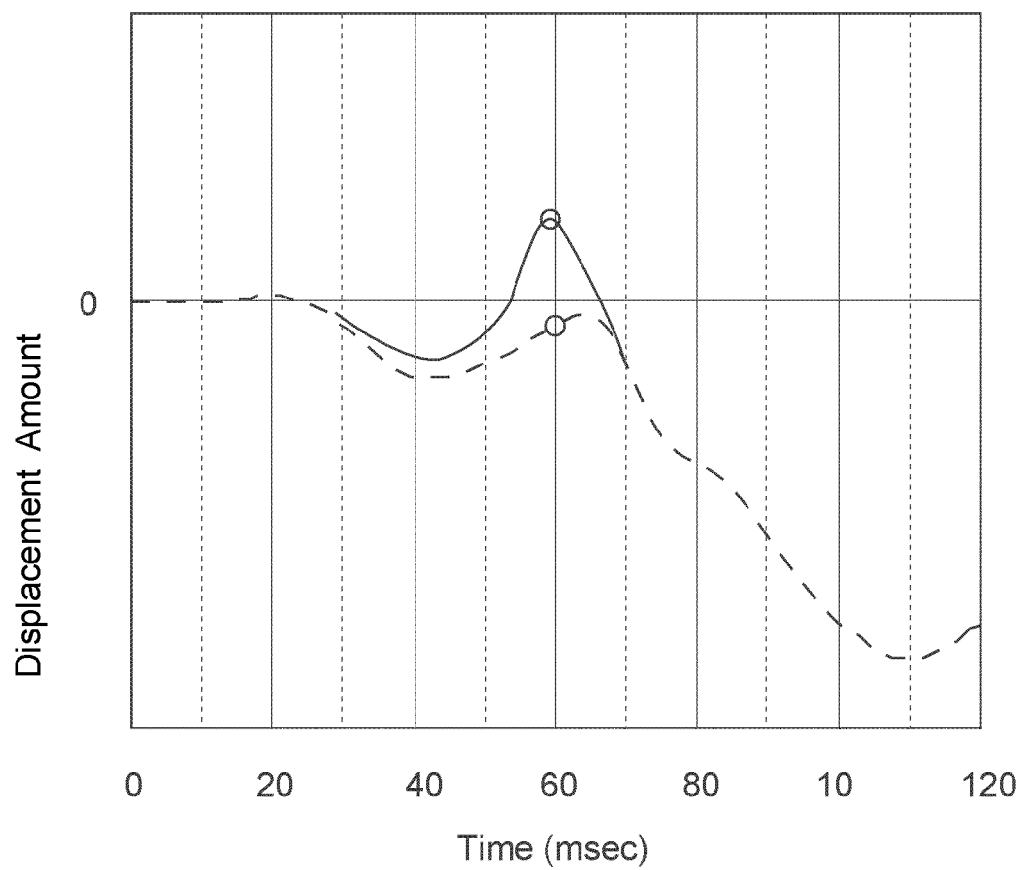
FIG. 5 is an explanatory diagram illustrating a comparison between the behavior of a headrest of the present invention and the behavior of a headrest of conventional technology in the event of a vehicle rear collision.

The behavior of the headrest 40 when this occurs is explained with reference to FIG. 5. Note that in FIG. 5, the displacement amount of the headrest 40 with respect to the upper frame 18 is shown against the time since the vehicle rear collision occurred. As shown by the solid line in FIG. 5, at the point in time of vehicle rear collision, an impact force towards the vehicle front is input into the upper frame 18 (seatback frame 14), and the headrest 40 is initially displaced towards the vehicle rear with respect to the upper frame 18 under inertia, before being displaced towards the vehicle front.

When this occurs, there is large displacement of the headrest 40 towards the vehicle front, with the peak time at about 60 msec, due to configuring the bending rigidity of the stay 46 (including the grommets 22) towards the vehicle front lower than the bending rigidity of the stay 46 (including the grommets 22) towards the vehicle rear.

In the event of a vehicle rear collision the head H of the occupant moves towards the vehicle rear under inertia. During a vehicle rear collision, the head H contacts the headrest 40 at the peak displacement of the headrest 40 towards the vehicle front (in FIG. 5 the contact time is marked by a circle) due to adjusting the bending rigidity of the stay 46 (including the grommets 22) such that the contact time corresponds to the peak time. A decrease in the velocity with which the head H enters the headrest 40 is accordingly suppressed since the velocity of the headrest 40 towards the vehicle front is zero when the head H makes contact with the headrest 40.

Figure 6:
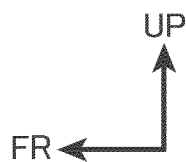
FIG. 6 is a cross-section illustrating a state in which a grommet of conventional technology is retained in a holder, as viewed from the left of a vehicle.
Figure 6:
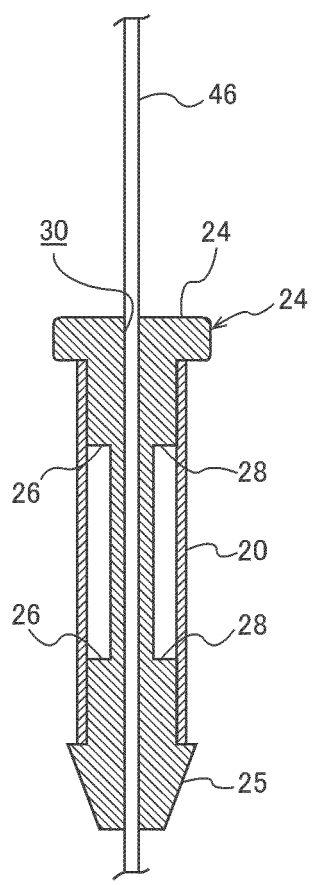

However as illustrated in FIG. 6, in the conventional technology a pair of protrusion portions 26 are provided at both length direction end portions of vehicle front portions of grommets 22, and the bending rigidity of the stay 46 (including the grommets 22) towards the vehicle rear and the bending rigidity of the stay 46 (including the grommets 22) towards the vehicle front are set so as to be the same as each other. The headrest 40 is supported by the seatback frame 14. As illustrated by the dotted line in FIG. 5, in the conventional technology, in the event of a vehicle rear collision the headrest 40 is initially displaced towards the vehicle rear with respect to the upper frame 18, after which the headrest 40 is displaced towards the vehicle front. However, in the conventional technology, there is no large displacement of the headrest 40 towards the vehicle front since the bending rigidity of the stay 46 (including the grommets 22) towards the vehicle rear and the bending rigidity of the stay 46 (including the grommets 22) towards the vehicle front are set the same as each other. There could therefore be occasions on which the head H contacts the headrest 40 before the peak time and when the velocity of the headrest 40 towards the vehicle front is greater than the reference value (see the circle on the dotted line in FIG. 5).

Figure 7A:
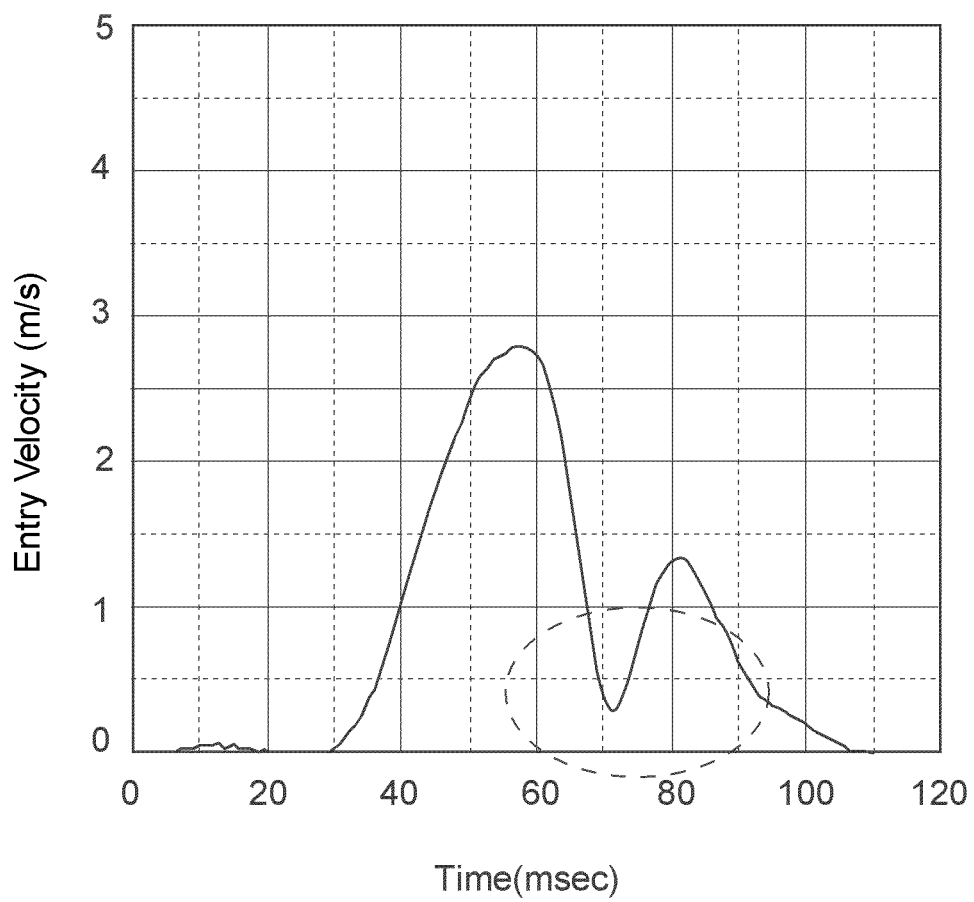
FIG. 7A is an explanatory diagram illustrating the velocity with which the head of an occupant enters a headrest in the event of a vehicle rear collision in conventional technology.

Accordingly in the conventional technology, the velocity of the headrest 40 towards the vehicle front is reduced by the collision between the head H and the headrest 40 when the head H contacts the headrest 40, and the velocity with which the head H enters the headrest 40 becomes slower (see the inside of the frame indicated by the dotted line in FIG. 7A).

Figure 7B:
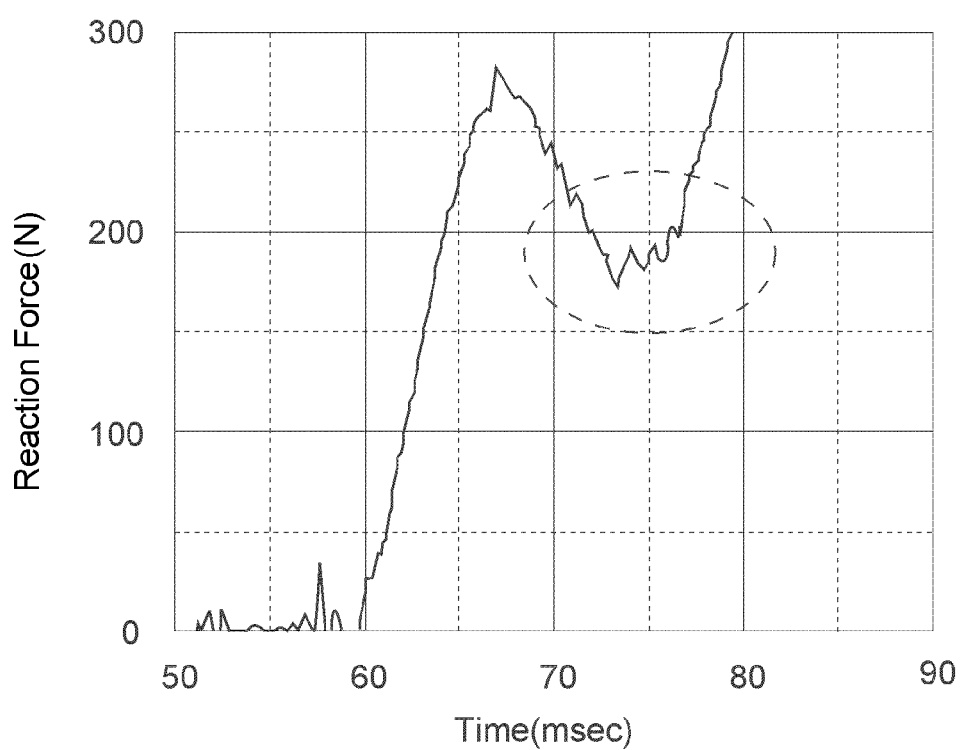
FIG. 7B is an explanatory diagram illustrating reaction force from a headrest to the head illustrated in FIG. 7A.

Note that the pad portion 42 of the headrest 40 is formed from a urethane foamed material. The load-deflection curve of the headrest 40 formed from a comparatively soft material such as urethane generally depends on the velocity with which the head H enters the headrest 40. Namely, a reaction force of the headrest 40 with respect to the head H decreases with a reduction in the velocity with which the head H enters the headrest 40 (see inside the frame indicated by the dotted line in FIG. 7B).

Figure 7C:
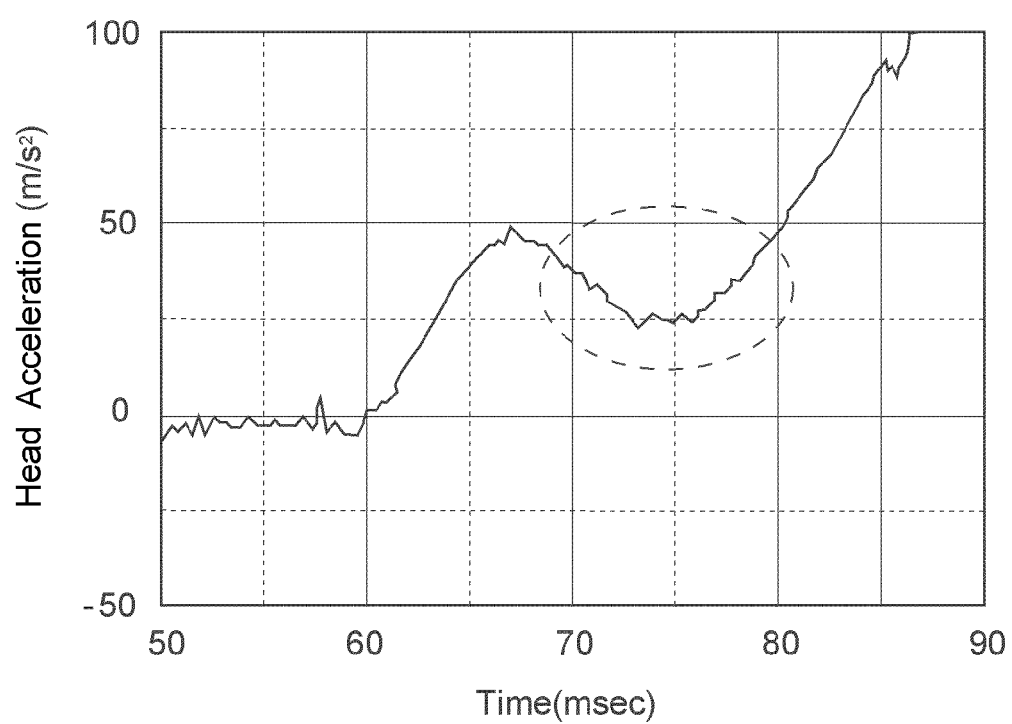
FIG. 7C is an explanatory diagram illustrating acceleration of the head illustrated in FIG. 7A.
Figure 8:
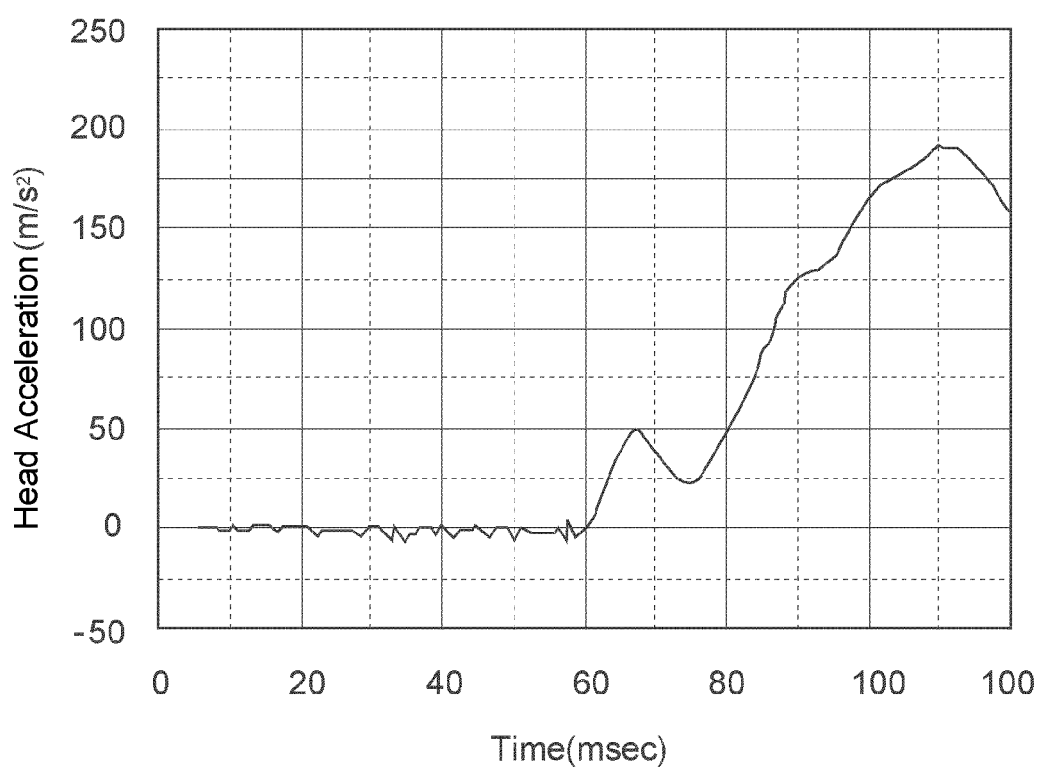
FIG. 8 is an explanatory diagram illustrating a head acceleration in the event of a vehicle rear collision in conventional technology.

In the balance of the reaction force of the headrest 40 with respect to the head H against the force of the head H acting on the headrest 40, the acceleration of the head H (referred to below as "head acceleration") decreases with a reduction in the reaction force of the headrest 40 with respect to the head H since the weight of the head H is fixed (see inside the frame indicated by the dotted line in FIG. 7C). The head acceleration of the head H accordingly corresponds to the curve illustrated in FIG. 8.

Figure 9:
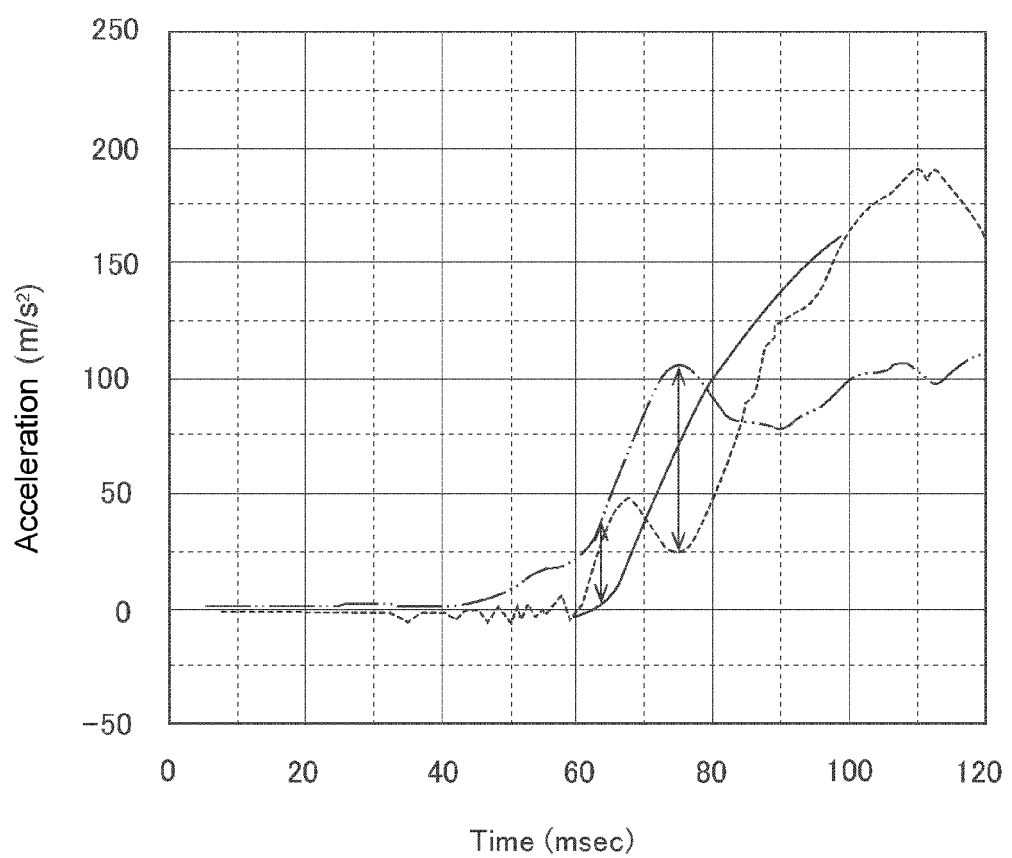
FIG. 9 is an explanatory diagram illustrating a comparison of accelerations of the head and the shoulders of an occupant in the event of a vehicle rear collision in the present invention and in conventional technology.

Accordingly, as illustrated in FIG. 9, in the conventional technology represented by the dotted line there are occasions when the head acceleration of the head H decreases (falls) when the head H is restrained by the headrest 40. However, in the present invention indicated by the solid line, a decrease in the head acceleration of the head H is suppressed.

A comparison follows between whiplash injury criterion (NIC) with the present invention and the conventional technology, with reference to FIG. 9. Note that in FIG. 9, the double-dotted intermittent line indicates the acceleration of the shoulders of an occupant, the dotted line indicates head acceleration in the conventional technology, and the solid line indicates head acceleration in the present invention. In the conventional technology, the maximum difference between the shoulder acceleration and the head acceleration of the head H of the occupant occurs at about 75 msec (see the arrow in FIG. 9), whereas in the present invention the maximum difference between the shoulder acceleration and the head acceleration of the head H of the occupant occurs at about 65 msec (see the arrow in FIG. 9). As is clear from the diagram, the maximum difference between the shoulder acceleration and the head acceleration of the occupant is smaller in the present invention than in the conventional technology. The present invention accordingly enables an improved NIC value over the conventional technology, since according to the NIC, the sustained injury value becomes smaller the smaller the difference between the acceleration of the shoulders of the occupant and the head acceleration over a given time following a vehicle rear collision.

As described above, in the vehicle seat 10 the stay 46 (including the grommets 22) is set such that the bending rigidity towards the vehicle front is smaller than the bending rigidity towards the vehicle rear. Accordingly, since the bending rigidity of the stay 46 (including the grommets 22) towards the vehicle rear is greater than the bending rigidity towards the vehicle front, when impact force is input into the seatback 40 in the event of a vehicle rear collision and the headrest 40 oscillates, the headrest 40 is initially displaced under inertia towards the vehicle rear, however within a short period of time the headrest 40 changes direction and begins to be displaced towards the vehicle front. There is moreover a large displacement of the headrest 40 towards the vehicle front since the bending rigidity of the stay 46 (including the grommets 22) towards the vehicle front is lower than the bending rigidity towards the vehicle rear. The time until the headrest 40 contacts the head H of the occupant can accordingly be made shorter. The head H of the occupant that has moved towards the vehicle rear in a vehicle rear collision can accordingly be promptly restrained by the headrest 40. Moreover, by setting the bending rigidity of the stay 46 including the grommets 22, the headrest 40 can be promptly displaced towards the side of the head H of the occupant, thereby enabling the time until the headrest 40 contacts the head of the occupant to be made shorter with a simple configuration.

In the vehicle seat 10, the bending rigidity of the stay 46 (including the grommets 22) is adjusted such that in the event of a vehicle rear collision, the contact time until the head H of the occupant contacts the headrest 40 corresponds to the peak time until the maximum displacement of the headrest 40 towards the vehicle front. A reduction in the velocity of the head H of the occupant at the point in time that the head H contacts the headrest 40 (the point in time that the headrest 40 begins to restrain the head H of the occupant) is accordingly suppressed. A reduction in the velocity with which the head H enters the headrest 40 is thereby suppressed, enabling a reduction in the head acceleration of the head H as the headrest 40 restrains the head H to be suppressed. An improvement in NIC can accordingly be achieved.

In the vehicle seat 10, the protrusion portions 26 are provided at length direction intermediate portions of the vehicle front portions of the respective grommets 22, and the pairs of protrusion portions 28 are provided at both length direction end portions of the vehicle rear portions of the grommets 22. The upper protrusion portions 28 are moreover disposed further towards the headrest 40 side than the protrusion portions 26. The grommets 22 are accordingly supported by the upper protrusion portions 28 during displacement of the headrest 40 towards the vehicle rear, and the retaining members are supported by the protrusion portions 26 during displacement of the headrest 40 towards the vehicle front. Since the distance from the headrest 40 to the protrusion portions 26 is greater than the distance from the headrest 40 to the upper protrusion portions 28, configuration is made such that the headrest 40 is displaced towards the vehicle front more readily than the headrest 40 is displaced towards the vehicle rear. The contact time until the headrest 40 contacts the head H of the occupant can accordingly be easily set by changing the position of the protrusion portions 26 in the axial direction (length direction) of the grommets 22.

In the vehicle seat 10, the protrusion portions 26 and the protrusion portions 28 are integrally formed to the grommets 22, thereby enabling the protrusion portions 26 and the protrusion portions 28 to be provided whilst suppressing an increase in cost.

Moreover, in the vehicle seat 10, the grommets 22 are formed from resin, thereby enabling the bending rigidity of the stay 46 including the grommets 22 to be easily adjusted by changing the material employed for the grommets 22.

Note that in the present exemplary embodiment, the bending rigidity of the stay 46 (including the grommets 22) is adjusted such that the headrest 40 contacts the head H of the occupant at the peak time of displacement towards the vehicle front, however the bending rigidity of the stay 46 (including the grommets 22) may be adjusted such that the headrest 40 contacts the head H of the occupant at or later than the peak time of displacement of the headrest 40 towards the vehicle front. In such cases, the bending rigidity of the stay 46 (including the grommets 22) can be adjusted by for example varying the position of the protrusion portions 26 in the length direction (axial direction) of the grommets 22. Moreover, in such cases the contact time until the headrest 40 contacts the head H of the occupant is equal to or longer than the reference time, and the head H contacts the headrest 40 as the headrest 40 is being displaced towards the vehicle rear. A reduction in the velocity with which the head H of the occupant enters the headrest 40 can accordingly be suppressed when the head H contacts the headrest 40. A reduction in the acceleration as the headrest 40 restrains the head H of the occupant in the event of a vehicle rear collision can accordingly be suppressed.

As described above, in the present exemplary embodiment the bending rigidity of the stay 46 (including the grommets 22) is adjusted such that the headrest 40 contacts the head H of the occupant at the peak time. Alternatively, the bending rigidity of the stay 46 (including the grommets 22) may be adjusted such that the headrest 40 contacts the head H of the occupant prior to the peak time and at or later than the reference time. In such cases, a reduction in the velocity with which the head H enters the headrest 40 can be suppressed since the velocity of the headrest 40 towards the vehicle front as the head H impacts the headrest 40 is the reference value or below. A reduction in the acceleration of the head H as the headrest 40 restrains the head H of the occupant in the event of a vehicle rear collision can accordingly be suppressed.

Moreover, in the present exemplary embodiment the protrusion portions 26 and the protrusion portions 28 are provided to the grommets 22. The protrusion portions 26 and the protrusion portions 28 may alternatively be provided to the holders 20. The protrusion portions 26 and the protrusion portions 28 may for example be formed by bending the holders 20.

In the present exemplary embodiment, the protrusion portions 26 and the protrusion portions 28 are integrally provided to the grommets 22. Alternatively, the protrusion portions 26 and the protrusion portions 28 may be provided to the grommets 22 as separate bodies. In such cases, the bending rigidity of the stay 46 including the grommets 22 can be easily adjusted by changing the shapes and the material of the protrusion portions 26 and the protrusion portions 28.

Moreover, in the present exemplary embodiment the pairs of protrusion portions 28 are provided at positions at both length direction end portions of the vehicle rear portions of the grommets 22. Configuration may alternatively be made wherein the protrusion portions 28 are provided to the entire faces of the vehicle rear portions of the grommets 22. The number of the protrusion portions 28 may also be set as appropriate. Namely, it is sufficient that the protrusion portions 28 are provided so as to be disposed towards the headrest 40 side with respect to at least the protrusion portions 26.

In the present exemplary embodiment, configuration is made wherein the stay 46 of the headrest 40 is supported by the holders 20 of the seatback frame 14 through the grommets 22, however the headrest 40 may be configured so as to function as what is known as an active headrest.

What is claimed is:

1. A vehicle seat comprising:
a seatback that holds an upper torso of an occupant;
a headrest that is provided above the seatback, the headrest including a pad portion that supports a head of the occupant and a support member that projects out from the pad portion and supports the pad portion;
an attachment portion that is fixed to the seatback;
a retaining member that is attached to the seatback via the attachment portion, the retaining member having an insertion hole into which the support member is inserted;
a front side restriction portion that restricts bending of the retaining member towards a vehicle front at a vehicle front side part of the retaining member and the attachment portion; and
a pair of rear side restriction portions that restricts bending of the retaining member towards a vehicle rear at a vehicle rear side part of the retaining member and the attachment portion; wherein:
one of the pair of rear side restriction portions being located on a headrest side with respect to the front side restriction portion, such that the retaining member has a bending rigidity towards the vehicle front lower than a bending rigidity towards the vehicle rear;
the retaining member is formed in a tube shape, and the pair of rear side restriction portions are provided in an axial direction of the retaining member such that each rear side restriction portion projects from the retaining member towards the vehicle rear;
the front side restriction portion is disposed in the axial direction of the retaining member between the pair of rear side restriction portions such that the front side restriction portion projects from the retaining member towards the vehicle front;
wherein the front side restriction portion fills a space between an inner wall of the attachment portion and the support member, the retaining member comprises front side voids on the vehicle front side portion of the retaining member, which voids leave respective spaces between the attachment portion and the support member, the spaces straddling the front side restriction portion axially, and the pair of rear side restriction portions fill a space between the inner wall of the attachment portion and the support member axially above and below a rear side void formed in the vehicle rear side part of the retaining member such that the rear side void leaves a space between the attachment portion and the support member on a rear side of the retaining member between the pair of rear side restriction portions.

2. A method for adjusting a bending rigidity of the vehicle seat of claim 1 comprising adjusting a location of the at least one of the pair of rear side restriction portions to adjust the bending rigidity of the retaining member with the support member inserted thereto such that a contact time until the head of the occupant contacts the headrest in an event of a vehicle rear collision is equal to or greater than a reference time in which a velocity of the headrest towards the vehicle front reaches a reference value or below.

3. The vehicle seat of claim 1, wherein the front side restriction portion and the pair of rear side restriction portions are integrally formed to the retaining member, and are restrained by the seatback.

* * * * *